United States Patent [19]

Suzuki et al.

[11] 4,021,058

[45] May 3, 1977

[54] SAFETY BAG DEVICE FOR VEHICLE

[75] Inventors: Mikio Suzuki, Hekinan; Yoshiyuki Hattori, Nagoya, both of Japan

[73] Assignee: Nippon Soken, Inc., Nishio, Japan

[22] Filed: Oct. 28, 1975

[21] Appl. No.: 626,565

[30] Foreign Application Priority Data

Oct. 30, 1974 Japan .................... 49-125740

[52] U.S. Cl. .................... 280/737; 222/3; 137/68 A; 137/516.11; 137/71

[51] Int. Cl.² .................... B60R 21/08

[58] Field of Search .......... 280/735, 736, 741, 742, 280/737; 137/68 A, 71, 516.11, 543.15; 222/3

[56] References Cited

UNITED STATES PATENTS

| | | | |
|---|---|---|---|
| 3,093,155 | 6/1963 | Dawes | 137/516.11 X |
| 3,777,772 | 12/1973 | Arnold et al. | 280/737 |
| 3,797,853 | 3/1974 | Grosch et al. | 137/71 |
| 3,813,007 | 5/1974 | Doin et al. | 280/736 |
| 3,847,412 | 11/1974 | Mattson | 280/736 |

*Primary Examiner*—Kenneth H. Betts
*Attorney, Agent, or Firm*—Cushman, Darby & Cushman

[57] ABSTRACT

In a safety bag device for use in a vehicle and of the type wherein a rupture plate is interposed between a high pressure gas container and a conduit leading to an inflatable safety bag. A nozzle having a plurality of nozzle holes opened into the conduit is interposed between the rupture plate and the conduit. A spool is slidably fitted to the nozzle in such a way that it may normally close a predetermined number of nozzle holes, but may be displaced away from the nozzle to open them in response to the increase in pressure in the nozzle chamber when the rupture plate is ruptured in case of a collision, whereby the flow rate of the high pressure gas flowing into the inflatable safety bag may be suitably controlled so as to prevent very rapid expansion of the bag resulting in the injury to an occupant.

4 Claims, 5 Drawing Figures

SAFETY BAG DEVICE FOR VEHICLE

BACKGROUND OF THE INVENTION

The present invention relates to generally a safety bag device for protecting the occupants in a vehicle in case of a collision, and more particularly to a safety bag device provided with a flow control device for controlling the flow rate of the high pressure gas to be injected into an inflatable safety bag.

There has been devised and demonstrated a safety bag device of the type comprising an inflatable safety bag, a high pressure gas container, a conduit adapted to lead the high pressure gas discharge out of the container into the safety bag, a rupture plate interposed between the container and the conduit, a cylindrical spool guide disposed within the container, the opened end of said spool guide being fitted into the outlet opening of the container and closed with the rupture plate, said spool guide having a plurality of holes formed through the side wall thereof for admitting therein the high pressure gas in the container, and a spool slidably fitted into the spool guide in such a way as to open and close the holes, thereby controlling the flow rate of the high pressure gas flowing into the safety bag when the rupture plate is ruptured in case of a collision of the vehicle. In the safety bag device of the type described, an electric detonator is placed adjacent the rupture plate so that in case of a collision, the detonator is ignited to explode to rupture the rupture plate. As a result, the high pressure gas in the container flows through the holes of the guide into the conduit and then into the safety bag. However, the safety bag device of the type described has some defects that when the space between the guide and the spool slidably fitted therein is too small, the fragments of the ruptured plate impinge against the spool and that the impact of the explosion is exerted to the spool. As a result, the smooth displacement of the spool is adversely affected so that the satisfactory flow control of the high pressure gas cannot be attained. Further, when the space is increased in order to overcome the above problem, the flow rate of the high pressure gas increases resulting in very rapid expansion of the safety bag, thus causing the injury to the occupant.

SUMMARY OF THE INVENTION

One of the objects of the present invention is therefore to provide a safety bag device wherein the flow rate of the high pressure gas charged into the safety bag in case of a collision may be suitably controlled, whereby the injury to the occupant by the sudden expansion of the safety bag may be positively prevented.

The above and other objects may be attained by a safety bag device in accordance with the present invention comprising an inflatable safety bag, a high pressure gas source, a conduit adapted to lead the gas discharged from the gas source into the safety bag, rupture plate means interposed between the gas source and the conduit for normally interrupting the communication therebetween except for the case of a collision of the vehicle, a nozzle interposed between the rupture plate means and the conduit and having a plurality of nozzle holes opened into the conduit, and spool means slidably fitted to the nozzle for closing a predetermined number of the nozzle holes when the rupture plate is not ruptured and for opening the nozzle holes in response to the pressure increase in the nozzle as a result of the rupture of said rupture means, whereby the flow rate of the high pressure gas flowing into the safety bag may be suitably controlled so as to prevent the sudden expansion of the safety bag.

The above and other objects, features and advantages of the present invention will become more apparent from the following description of one preferred embodiment thereof take in conjunction with the accompanying drawing.

BRIEF DESCRIPTION OF THE DRAWING

Same reference numerals are used to designate similar parts throughout the figure.

DESCRIPTION OF THE PREFERRED EMBODIMENT

Figure 1:
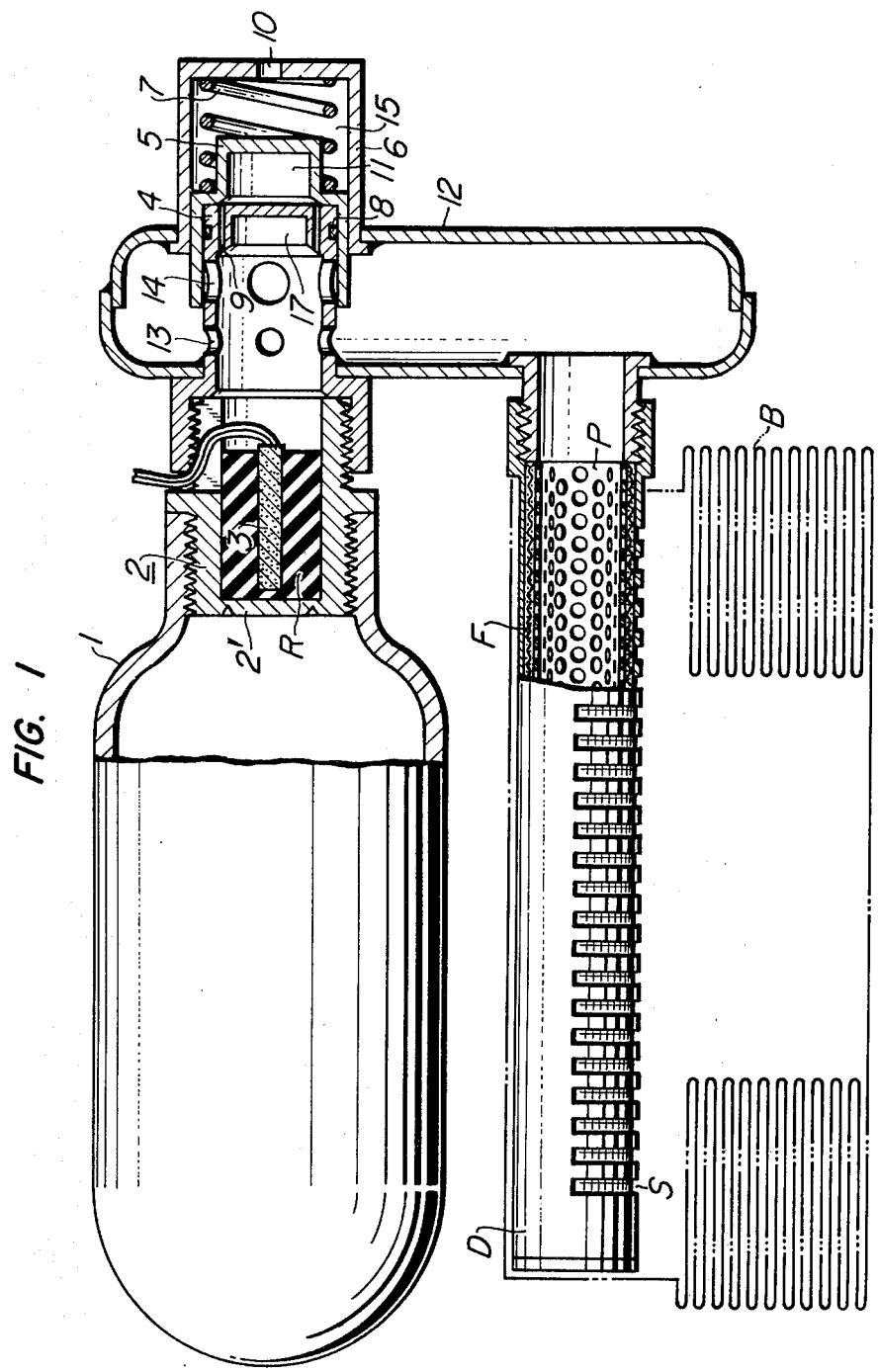
FIG. 1 is a schematic view, partly in section, of a safety bag device in accordance with the present invention.

Referring first to FIG. 1 illustrating one preferred embodiment of the present invention, a high pressure container constituting a high pressure gas source 1 has its outlet opening closed with a rupture plate assembly 2 including an electric detonator 3 electrically connected to collision detecting devices and a power supply (both not shown) through lead wires. The rupture plate assembly 2 has externally threaded screws and screwed into the internally screw threaded opening of the high pressure container 1, and the electronic detonator 3 is adapted to be ignited in response to the output signals from the collision detecting devices, thereby causing the rupture on the rupture plate assembly 2 so as to permit the discharge of the high pressure gas from the high pressure gas container 1 into an inflatable safety bag B through a nozzle 4 and a conduit 12 as will be described in detail hereinafter. The portion 2' to be ruptured, namely rupture plate, of the rupture plate assembly 2 is formed thinner or defined by an annular groove so that the ruptured opening with a predetermined opening area may be provided. In the instant embodiment, the high pressure gas container 1 contains the high pressure nitrogen. However, it is to be understood that it may contain any suitable high pressure gas with or without a gas-forming agent.

The nozzle 4 is interposed between the rupture plate assembly 2 and the conduit 12, and has a plurality of small- and large diameter nozzle holes 13 and 14 opened into the conduit 12. The small-and-large diameter nozzle holes 13 and 14 are arrayed in circumferential rows, respectively, and the row of the small diameter nozzle holes 13 is located closer to the rupture plate assembly 2 than the row of the large diameter nozzle holes 14.

Within a guide 6 in the form of a cylinder attached to the conduit 12 at a right angle relative to the axis thereof is slidably fitted a spool 5 which is slidable between the inner wall of the guide 6 and the outer wall surface of the nozzle 4, and is biased by a bias spring 7 so as to normally close the large diameter holes 14. Therefore, immediately after the rupture of the portion 2' of the rupture plate assembly 2, the flow rate of the high pressure gas discharged out of the high pressure gas container 1 and flowing into the inflatable bag B is controlled by the small diameter nozzle holes 13. A seal ring 8 is interposed between the nozzle 4 and the spool 5. The space 17 within the nozzle 4 is communicated with the space 11 defined between the nozzle 4 and the spool 5 through a plurality of small diameter holes 9 axially formed through the cylindrical side wall of the nozzle 4 so that the high pressure gas may be introduced into the space 11. The space 15 defined by the spool 5 and the guide 6, is communicated, not with the conduit 12, but with the surrounding atmosphere through a hole 10 formed through the wall of the guide 6 so that the pressure in the space 15 equals the atmospheric pressure.

The outlet of the conduit 12 is joined by welding to a diffuser D with a plurality of slits S through which is charged the high pressure gas into the bag B. Within the diffuser D are disposed a tubular perforated plate P and a filter F consisting of a few layers of wire screens wound in the form of a tube in order to prevent the passage into the bag B of the smaller fragments produced by the ignition and explosion of the electric detonator 3 and the rupture of the portion 2' of the rupture plate assembly and a retainer R which is made of, for instance, rubber, and is supporting the electric delonator 3.

In the instant embodiment, the inflatable bag B is made of plain weave nylon cloth sheet and of the conventional type provided with suction holes (not shown) for introducing the surrounding air, and is normally folded as shown in FIG. 1.

Figure 2:
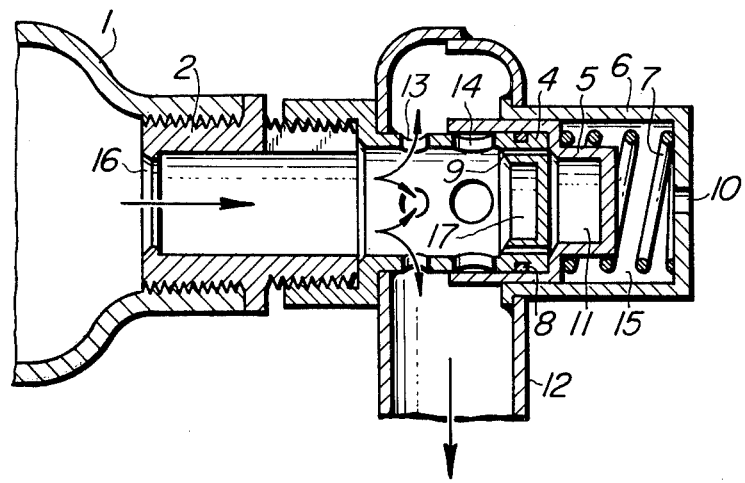
FIG. 2 is a fragmentary sectional view thereof illustrating a spool in normal position immediately after the rupture of a rupture plate.
Figure 3:
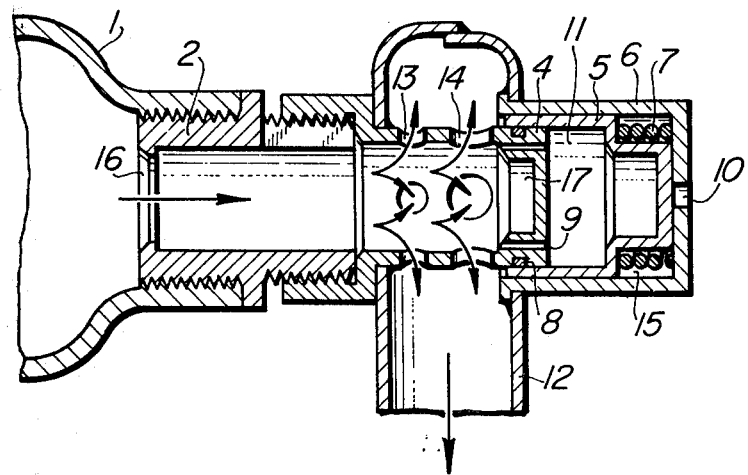
FIG. 3 is a view similar to FIG. 2, but illustrates the spool in retracted position.

Next the mode of operation of the air safety bag device with the above construction will be described with reference to FIGS. 2 and 3. In case of a collision, in response to the output signals from the collision detecting devices (not shown), the electric detonator 3 is ignited and exploded to rupture the portion 2' of the rupture plate assembly 2 so that the rupture opening 16 is formed. As a result, the high pressure nitrogen gas is discharged out of the container 1 into the nozzle 4, and larger explosion and rupture fragments are received in the space 17 in the nozzle 4. The discharged high pressure nitrogen gas flows into the conduit 12 as indicated by the arrows through the small diameter nozzle holes 13. Concurrently, the high pressure nitrogen gas flows through the holes 9 into the space 11, thereby forcing the spool 5 to retract away from the large diameter nozzle holes 14 against the bias spring 7 so that the large diameter holes 14 are gradually opened. As a result, the flow rate of the high pressure nitrogen gas flowing into the conduit 12 through the nozzle 4 is gradually increased. Until the large diameter nozzle holes 14 are wide open, the expansion of the bag B is so slow that the injuries to the occupant due to the sudden expansion of the bag B are completely prevented. When the large diameter nozzle holes 14 are wide open as shown in FIG. 3, the flow rate of the high pressure nitrogen gas is increased so that the bag B is inflated fully within a short time to protect the occupant.

Next referring to FIG. 4, the relationship between the area S of the ruptured opening 16 (See FIGS. 2 and 3) and the total area S' of the small-and-large diameter nozzle holes 13 and 14, on the one hand, and the pressure variation in the nitrogen gas in the container 1 will be described. When the flow control device consisting of the nozzle 4, the spool 5, and bias spring 7 is not provided, the pressure change is very rapid as indicated by the curve $a$ in FIG. 4. However, when the flow control device is provided in such way that $S > S'$ or $S \leq S'$, the pressure change is slow as indicated by the curve $c$ or $b$. Thus, the injuries to the occupants by the sudden expansion of the safety bag B may be very effectively prevented by the provision of the flow control device in accordance with the present invention.

Figure 4:
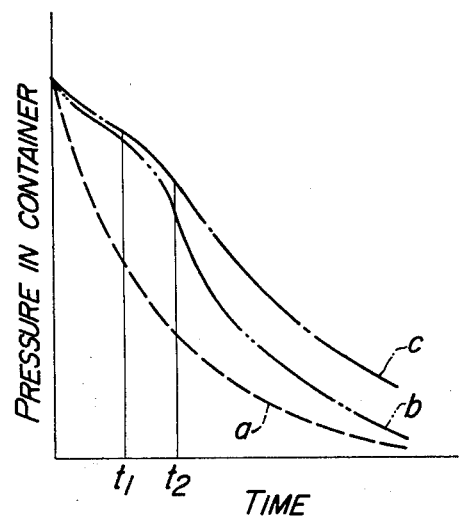
FIGS. 4 and 5 are diagrams used for the explanation of the mode of operation of the device in accordance with the present invention.

Furthermore, as shown in FIG. 4, when the ratio $S/S'$ is suitably selected, the pressure change in the container 1 may be suitably controlled after the time $t_2$ when the large-diameter nozzle holes 14 are wide opened.

Figure 5:
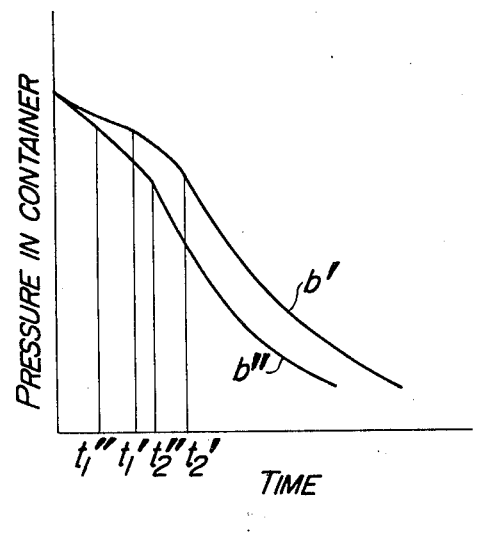

When the ratio $S/S'$ is so selected as to obtain the pressure change curve $b$ and when the total opening area $S''$ of the holes 9 is changed, the pressure curves as shown in FIG. 5 are obtained. That is, the curve $b'$ represents when the total opening area $S''$ is smaller while the curve $b''$, when the total opening area $S''$ is larger. It is seen that when the total opening area $S''$ is larger, both the time $t_1''$ when the large diameter nozzle holes 14 are started to be opened and the time $t_2''$ when the large diameter nozzle holes 14 are wide opened are faster than the corresponding time $t_1''$ and the time $t_2'$ when the total opening area $S''$ is smaller. Thus, the desired expansion or inflation characteristics of the safety bags may be attained by suitably selecting the ratio among the opening areas S, S' and S'' and the pressure of the bias spring 7.

So far the nozzle holes 13 and 14 of the nozzle 4 have been described as having the different diameters or opening areas, but it is to be understood that they may have the same diameter or opening area if the pitches of the nozzle hole rows are different, that is, the number of nozzle holes 14 is larger than that of nozzle holes 13.

As described above, in a safety bag device for use in a vehicle and of the type in which a rupture plate is interposed between a high pressure gas container and a conduit communicating the container with the bag, according to the present invention, a nozzle having a plurality of circumferential rows of nozzle holes opened into the conduit is interposed between the rupture plate and the conduit, and a spool is slidably fitted to the nozzle in such a way that a predetermined number of nozzle holes of the nozzle may be closed and opened in response to the pressure in the nozzle, whereby the flow rate of the high pressure gas flowing into the safety bag may be controlled. Therefore the rapid and dangerous expansion of the safety bag after the rupture of the rupture plate may be positively prevented, and the desired safety bag expansion or inflation characteristics may be attained. Furthermore, the flow rate control of the high pressure gas is not adversely affected by the larger fragments produced by the explosion and rupture.

What is claimed is:

1. In a safety bag device for use in a vehicle and of the type comprising an inflatable safety bag, a high pressure gas source, a conduit for leading the gas discharged from said gas source into said bag, and rupture plate means interposed between said gas source and said conduit for normally interrupting the communication between said gas source and said conduit unless said rupture plate means is ruptured in case of a collision of the vehicle, the improvement comprising:

a nozzle member interposed between said rupture plate means and said conduit and having a nozzle chamber and a plurality of nozzle holes opening into said conduit from said nozzle chamber for conducting gas from said source to said conduit following rupture of said rupture plate means, said nozzle member also having a head portion and at least one communication hole formed in said head portion and opening into said nozzle chamber;

spool means fitted to said nozzle member so as to define outside the head portion of said nozzle member a spool chamber communicating with said nozzle chamber through said communication hole, said spool means closing a predetermined number of said nozzle holes when said rupture plate is not ruptured and being slidable with respect to said nozzle member and in a first direction to open the predetermined number of nozzle holes when pressure in said spool chamber reaches a predetermined value as gas is introduced through said communication hole into said chamber in response to an increase in pressure in said nozzle chamber as a result of the rupture of said rupture plate means;

guide means attached to said conduit for guiding sliding movement of said spool means; and a bias spring disposed between said spool means and said guide means for urging said spool in a direction opposite to said first direction, whereby the flow rate of the high pressure gas into said safety bag may be controlled to be low at the intitial stage and higher thereafter.

2. An improvement as set forth in claim 1, wherein said plurality of said nozzle holes are arrayed in a plurality of rows.

3. An improvement as set forth in claim 1, wherein said rows comprises a first row and a second row, the first row includes a plurality of small diameter nozzle holes while the second row, a plurality of large diameter holes.

4. An improvement as set forth in claim 1, wherein a space is formed in said nozzle at one end portion thereof in opposed relation with the inlet port thereof, whereby the fragments produced by the rupture of said rupture plate means may be carried by the high pressure gas flow and received in said space.

* * * * *